3,514,327
ISOMERIZATION OF GLUCOSE, MALTOSE, AND LACTOSE WITH AMINO COMPOUNDS
Frederick W. Parrish, Natick, Mass., assignor to the United States of America as represented by the Secretary of the Army
No Drawing. Filed Sept. 27, 1967, Ser. No. 671,162
Int. Cl. C13k 9/00, 1/00; C07c 47/18
U.S. Cl. 127—42    10 Claims

ABSTRACT OF THE DISCLOSURE

Process for converting glueose to fructose, lactose to lactulose, and maltose to maltulose in good yield and without undesirable side products using triethylamine, N-(3 - aminopropyl)cyclohexylamine, N - ethylcyclohexylamine, N-(2-hydroxyethyl)cyclohexylamine or N-isopropylcyclohexylamine to effect the rearrangement.

---

The invention described herein may be manufactured, used, and licensed by or for the Government for governmental purposes without the payment to me of any royalty thereon.

This invention relates to a process for the conversion of glucose to fructose, lactose to lactulose, and maltose to maltulose by the epimerizing action thereon of an amino compound selected from the group consisting of triethylamine, N-(3-aminopropyl)cyclohexylamine, N-ethylcyclohexylamine, N-(2-hydroxyethyl)cyclohexylamine and N-isopropylcyclohexylamine.

The economic desirability of a practical process for the conversion of glucose to fructose is readily apparent when one considers the large quantities of glucose which are obtained at low cost by the hydrolytic conversion of corn starch to corn syrups. Corn syrups consist of glucose together with the disaccharide maltose and higher dextrins. The amount of glucose present depends on the degree of hydrolysis to which the starch is subjected. While corn syrups or glucose are capable of direct use as such in many food applications, because of the lower sweetness values of glucose or the corn syrups as compared to sucrose, the former cannot be used as a substitute for the latter where the greater level of sweetness is required. Fructose, an isomer of glucose, has a sweetness value that is equal to or greater than that of sucrose. If some of the glucose in corn syrups could be converted to fructose by a practical process, then the converted corn syrups would be suitable substitutes for sucrose in food processing. Corn syrups would also constitute an important alternative or back up supply for sucrose-based sweeteners in event of failure or loss of a sugar cane crop.

The isomerization of glucose to fructose by the action of aqueous alkali has long been known and was first reported by Lobry de Bruyn and Alberda van Ekenstein in 1895 (Rec. trav. chim. 14,203). Since that time, various alkali and other highly basic materials have been employed to bring about the isomerization and, more recently, it has been discovered that certain ion exchange resins are also effective for this purpose. None of the prior art methods, however, are suitable for commercial or large scale conversion of glucose to fructose because of the low yield rates, the loss or destruction of sugar and the formation of undesirable by-products which can only be removed with great difficulty and at great cost. For example, the use of strong bases to effect the isomerization causes a considerable portion of the glucose to be converted to organic acids which have no sweetness value and which may impart undesirable flavors to the products and, in addition, there are formed ketose sugars other than fructose which have little or no value, together with dark coloring substances which affect the color and appearance of the product. Ion exchange resins are subject to the same deficiencies and, in addition, are expensive and while not consumed in the process require expensive regeneration and suffer a certain loss by attrition in use.

Lactulose and maltulose are obtained from lactose and maltose, respectively, in accordance with this invention in good yield and without undesirable sugar or non-sugar side products. Lactulose is used in infant foods to produce a pure bifidus flora in the intestinal tracts of such infants. The presence of this flora in infants is a positive indication of a good state of health of the infant.

The present invention is based upon the discovery that certain selected amino compounds will effect a conversion of an aldose such as glucose, maltose or lactose to its corresponding ketose, fructose, maltulose, and lactulose in high yield rates and of even greater importance from the standpoint of developing a practical process without the loss of sugar or the formation of undesired sugar products. The amino compounds which effect this selective epimerizing action are triethylamine, N-(3-aminopropyl)cyclohexylamine, N-ethylcyclohexylamine, N-(2-hydroxyethyl)cyclohexylamine and N-isopropylcyclohexylamine.

The isomerization of glucose, lactose, or maltose is accomplished in accordance with the present invention by bringing together an aqueous solution of the sugar with one of the above-listed amino compounds and holding the solution until the conversion is completed. In addition to aqueous solutions, the sugar conversion can also be accomplished in mixed aqueous-lower alcohol solutions such as methanol, ethanol and propanol solutions, e.g., 75% n-propanol solution. The process proceeds readily at temperatures within the range from about 20° C. to about 100° C. and the preferred range is from about 35° C. to about 75° C. The reaction time required to effect the conversion or to reach an equilibrium will vary with the temperature with the reaction proceeding more quickly at the higher end of the temperature range. The separation of the sugar fractions from the mixed sugar solution is accomplished by techniques well known in the art and set forth in the examples to follow.

The following examples are given by way of illustration to more clearly disclose the nature of the present invention and set forth the best mode of performing the same known to the inventor. It should be understood, however, that the examples are not intended to be a limitation on the scope of the invention.

EXAMPLE 1

5 grams of pure glucose were dissolved in 100 ml. of water. There was added to this glucose solution 0.5 ml. of triethylamine. After stirring, the solution was maintained at a temperature of 35° C. for 48 hours. Paper chromatography indicated the presence of two sugar fractions in the solution. The solution was transferred to a column containing a strong base ion exchange resin in bisulfite form and fractionated by partition chromatography. The separation technique is that described by S. Adachi and H. Sugawara in the Arch. Biochem. Biophysics 100, 468–471 (1963). The fructose is eluted from the column by washing with n-propanol solution and the glucose was eluted with water. The amount of fructose recovered is 1.6 grams or a 32% yield.

Fructose was identified as the 2,3,4,5-di-O-isopropylidene derivative prepared by the procedure of D. J. Bell described in J. Chem. Soc. 1461–1464 (1947).

EXAMPLE 2

2 ml. of triethylamine were added to a solution of 10 grams of pure maltose in 200 ml. of water. The solution was held for 24 hours at a temperature of 50° C. No products other than maltose and maltulose were detected in the solution when analyzed by means of paper chromatography or gas liquid chromatography. Maltulose was separated from the solution by the procedure set forth in Example 1 with respect to the separation of fructose. The yield of maltose was 4 grams which was a 40% conversion.

EXAMPLE 3

To a solution containing 10 grams of glucose in 200 ml. of water there was added 4 ml. of triethylamine. The solution was held for 24 hours at a temperature of 35° C. Evaluation of the resultant solution by measuring the specific optical rotation, paper chromatography and gas liquid chromatography failed to indicate the presence of any sugar materials other than glucose and fructose. The fructose was separated from the solution as in Example 1 and the yield was 3.5 grams or 35%.

EXAMPLE 4

The procedure of Example 3 was repeated using 4 ml. of N-(3-aminopropyl) cyclohexylamine. As in Example 3, no products other than glucose and fructose were detected. The yield of fructose was 36%.

EXAMPLE 5

The procedure in Example 4 was repeated using in lieu of the amino compound of that example each of the following three amino compounds, N - ethylcyclohexylamine, N-(2 - hydroxyethyl) cyclohexylamine or N-isopropylcyclohexylamine. As was the case in Example 4, no compounds other than glucose and fructose were detected in any of the resultant solutions. The yield of fructose with N-ethylcyclohexylamine was 19% with N-(2-hydroxyethyl) cyclohexylamine 12% and with N-isopropylcyclohexylamine 19%.

EXAMPLE 6

Three identical samples were prepared containing 5 grams of pure lactose in 100 ml. of water. To each sample there was added 1.0 ml. of triethylamine. After 25 hours the samples were analyzed and found to contain a mixture of lactose and lactulose. No other products were detected in the solution when subjected to paper chromatography or gas-liquid chromatography. The yields of lactulose for solutions which were held under differing temperature conditions were respectively 32% at 38° C., 30% at 55° C. and 33% at 75° C. Separation of the components of the solution was accomplished by the technique set forth in Example 1.

I claim:
1. A process for converting an aldose selected from the group consisting of glucose, maltose and lactose to its corresponding ketose, fructose, maltulose or lactulose without the loss of sugar or the formation of undesired sugar products, which comprises subjecting an aqueous solution of said aldose to the action of an amino compound selected from the group consisting of triethylamine, N - (3-aminopropyl)cyclohexylamine, N-ethylcyclohexylamine, N-(2-hydroxyethyl)cyclohexylamine and N-isopropylcyclohexylamine.
2. A process according to claim 1 wherein said process occurs at temperatures from 20° C. to 100° C.
3. A process according to claim 2 wherein said aldose is maltose and the resulting ketose is maltulose.
4. A process according to claim 2 wherein said aldose is lactose and the resulting ketose is lactulose.
5. A compound according to claim 2 wherein said aldose is glucose and the resulting ketose is fructose.
6. A process according to claim 5 wherein said amino compound is triethylamine.
7. A process according to claim 5 wherein said amino compound is N-(3-aminopropyl) cyclohexylamine.
8. A process according to claim 5 wherein said amino compound is N-ethylcyclohexylamine.
9. A process according to claim 5 wherein said amino compound is N-(2-hydroxyethyl) cyclohexylamine.
10. A process according to claim 5 wherein said amino compound is N-isopropylcyclohexylamine.

References Cited

UNITED STATES PATENTS 2,354,664  8/1944  Cantor et al.
3,432,345  3/1969  Tsao et al. _____ 127—42

OTHER REFERENCES

Ishikawa I: "Decomposition . . . cyclohexylamine," Chem. Absts. 63:1852, 3 (1965).

Ishikawa II: "Production . . . cyclohexylamine," Chem. Absts. 63:1853 (1965).

Graefe: "Conversion of D Glucose in Ammoniacal Soln., S.I.A. 17:3:67 (1955).

Mendicino: "Effect . . . Sugars," J. Am. Chem. Soc. 82:4975–79 (1960).

MORRIS O. WOLK, Primary Examiner

D. G. CONLIN, Assistant Examiner

U.S. Cl. X.R.

127—30, 31, 41; 260—209